United States Patent
Moritani

(10) Patent No.: US 6,415,115 B1
(45) Date of Patent: Jul. 2, 2002

(54) IMAGE FORMING METHOD AND APPARATUS CAPABLE OF PRINTING IMAGE IN SINGLE SIDE/DOUBLE SIDE PRINTING MODE

(75) Inventor: Mitsuaki Moritani, Yokohama (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 0 days.

(21) Appl. No.: 09/526,516

(22) Filed: Mar. 16, 2000

(51) Int. Cl.[7] .............................................. G03G 15/00
(52) U.S. Cl. ....................................................... 399/82
(58) Field of Search ............................. 399/82; 358/296

(56) References Cited

U.S. PATENT DOCUMENTS 6,050,732 A * 4/2000 Tsusaka ........................ 400/76
6,292,267 B1 * 9/2001 Mori et al. ................. 358/1.15

FOREIGN PATENT DOCUMENTS

JP          11-88668          3/1999

* cited by examiner

*Primary Examiner*—Quana M. Grainger
(74) *Attorney, Agent, or Firm*—Foley & Lardner

(57) ABSTRACT

An image forming method includes the reception step of receiving image information including control information representing one of single-side printing and double-side printing for each page, and the image formation step of determining for each page in accordance with the control information whether the image information requires one of single-side printing and double-side printing, and forming the image information of the page on an image forming medium. Single-side/double-side printing control information at the header enables printing images in single-side and double-side printing modes.

12 Claims, 10 Drawing Sheets

STACK PRINTING OPERATION

|  |  | PRINTING ORDER |
|---|---|---|
| PAGE 1 | SINGLE-SIDE PAGE | 5TH |
| PAGE 2 | SINGLE-SIDE PAGE | 6TH |
| PAGE 3 | UPPER-SIDE PAGE OF DOUBLE-SIDE PAGES | 7TH |
| PAGE 4 | <u>LOWER-SIDE PAGE OF DOUBLE-SIDE PAGES</u> | (1)ST |
| PAGE 5 | UPPER-SIDE PAGE OF DOUBLE-SIDE PAGES | 8TH |
| PAGE 6 | <u>LOWER-SIDE PAGE OF DOUBLE-SIDE PAGES</u> | (2)ND |
| PAGE 7 | UPPER-SIDE PAGE OF DOUBLE-SIDE PAGES | 9TH |
| PAGE 8 | <u>LOWER-SIDE PAGE OF DOUBLE-SIDE PAGES</u> | (3)RD |
| PAGE 9 | UPPER-SIDE PAGE OF DOUBLE-SIDE PAGES | 10TH |
| PAGE 10 | <u>LOWER-SIDE PAGE OF DOUBLE-SIDE PAGES</u> | (4)TH |
| PAGE 11 | SINGLE-SIDE PAGE | 11TH |
| PAGE 12 | SINGLE-SIDE PAGE | 12TH |

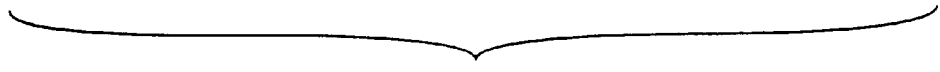

FIG. 10

| | |
|---|---|
| header TRANSMISSION | 12:REGISTRATION IN SINGLE-SIDE PRINTING TABLE |
| 12:SINGLE-SIDE PAGE | 1:PRINTING ON SHEET FROM STACK |
| header TRANSMISSION | 13:REGISTRATION IN SINGLE-SIDE PRINTING TABLE |
| 13:UPPER-SIDE PAGE OF DOUBLE-SIDE PAGES | 3:PRINTING ON SHEET FROM STACK |
| header TRANSMISSION | 14:REGISTRATION IN SINGLE-SIDE PRINTING TABLE (SHEET IS NOT STOCKED DURING PRINTING OF UPPER-SIDE PAGE) |
| 14:LOWER-SIDE PAGE OF DOUBLE-SIDE PAGES | 5:STRAIGHT PRINTING |
| header TRANSMISSION | 15:REGISTRATION IN SINGLE-SIDE PRINTING TABLE |
| 15:UPPER-SIDE PAGE OF DOUBLE-SIDE PAGES | 6:PRINTING ON SHEET FROM STACK |
| header TRANSMISSION | 16:REGISTRATION IN SINGLE-SIDE PRINTING TABLE (SHEET IS NOT STOCKED DURING PRINTING OF UPPER-SIDE PAGE) |
| 16:LOWER-SIDE PAGE OF DOUBLE-SIDE PAGES | 8:PRINTING ON SHEET FROM STACK |
| END | 10:PRINTING ON SHEET FROM STACK |
| | STACK IS FULL (PRINTING IS SWITCHED TO UPPER-SIDE PAGE) |
| | 12:STRAIGHT PRINTING     STACK IS EMPTY, AND UNPRINTED LOWER-SIDE PAGES ARE LEFT(REMAINING LOWER-SIDE PAGES OF SET ARE PRINTED) |
| | 14:PRINTING ON SHEET FROM STACK |
| | 16:PRINTING ON SHEET FROM STACK |
| | ALL LOWER-SIDE PAGES ARE PRINTED |
| | 13:PRINTING ON SHEET FROM STACK |
| | 15:PRINTING ON SHEET FROM STACK |

FIG. 11B

IMAGE FORMING METHOD AND APPARATUS CAPABLE OF PRINTING IMAGE IN SINGLE SIDE/DOUBLE SIDE PRINTING MODE

BACKGROUND OF THE INVENTION

The present invention relates to an image forming method of receiving, e.g., externally input image information in single-side and double-side printing modes, and sequentially forming images, and an image forming apparatus using this method.

An image forming apparatus such as a digital copying machine or printer can receive image information-from a terminal device such as an external personal computer via a communication means such as a cable, form an image corresponding to the received information on a recording medium, and output the image. This is done when, for example, a document prepared by operating by the user a terminal device connected to an image forming apparatus via a connection cable is to be printed in accordance with an instruction output from the terminal device. In this image formation processing, even if a series of pieces of image information transmitted at once are a document having a plurality of pages, all the pieces of image information are printed as image information of single-side or double-side printing pages. Image information including single- and double-side printing pages cannot be printed as one task.

However, as image forming apparatuses such as a printer and terminal devices such as a computer are widely spread, various needs arise for printing of a prepared document including single- and double-side printing pages. To print such document by a conventional image forming apparatus, single- and double-side pages must be reedited as separate document data, transmitted as separate document data to the image forming apparatus, and printed. This makes the operation cumbersome, prolongs the operation time, and causes malfunctions.

BRIEF SUMMARY OF THE INVENTION

It is an object of the present invention to provide an image forming method capable of printing image information in single- and double-side printing modes, and an image forming apparatus for implementing this method.

To achieve the above object, according to the present invention, there is provided an image forming method comprising: the reception step of receiving image information including control information representing one of single-side printing and double-side printing for each page; and the image formation step of determining for each page corresponding to the control information received in the reception step whether the image information requires one of single-side printing and double-side printing, and forming the image information of the page on an image forming medium.

As described above, according to the present invention, control information representing one of single-side and double-side printing that is added to the header of image information for each page is received and determined to select a designated printing mode for each page. While image information is received, images are sequentially formed. The present invention can provide an image forming method capable of instructing printing of image information in single- and double-side printing modes, which cannot be executed in a conventional apparatus, with a simple operation similar to printing of all single-side pages or printing of all double-side pages in the conventional apparatus.

Moreover, the present invention can provide stackless and stack image forming apparatuses for implementing the image forming method with the same effects.

BRIEF DESCRIPTION OF THE SEVERAL VIEWS OF THE DRAWING

FIG. 10 is a view for explaining the second stackless printing operation according to the present invention;

FIGS. 11A and 11B are views for explaining the third stackless printing operation according to the present invention.

DETAILED DESCRIPTION OF THE INVENTION

Embodiments of the present invention will be described in detail below with reference to the several views of the accompanying drawing.

Figure 1:
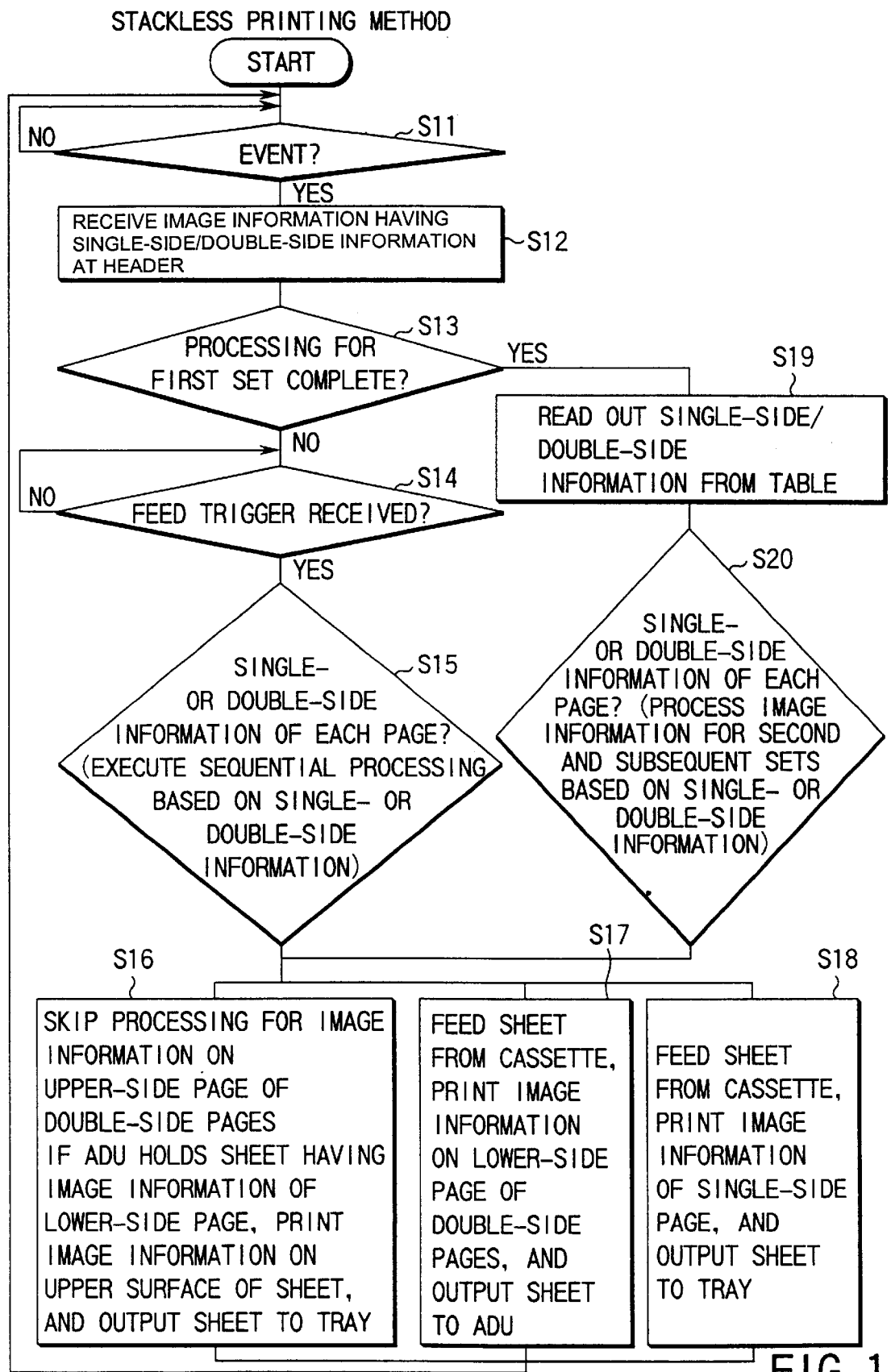
FIG. 1 is a flow chart showing a stackless image forming method according to the first embodiment of the present invention.
Figure 2A:
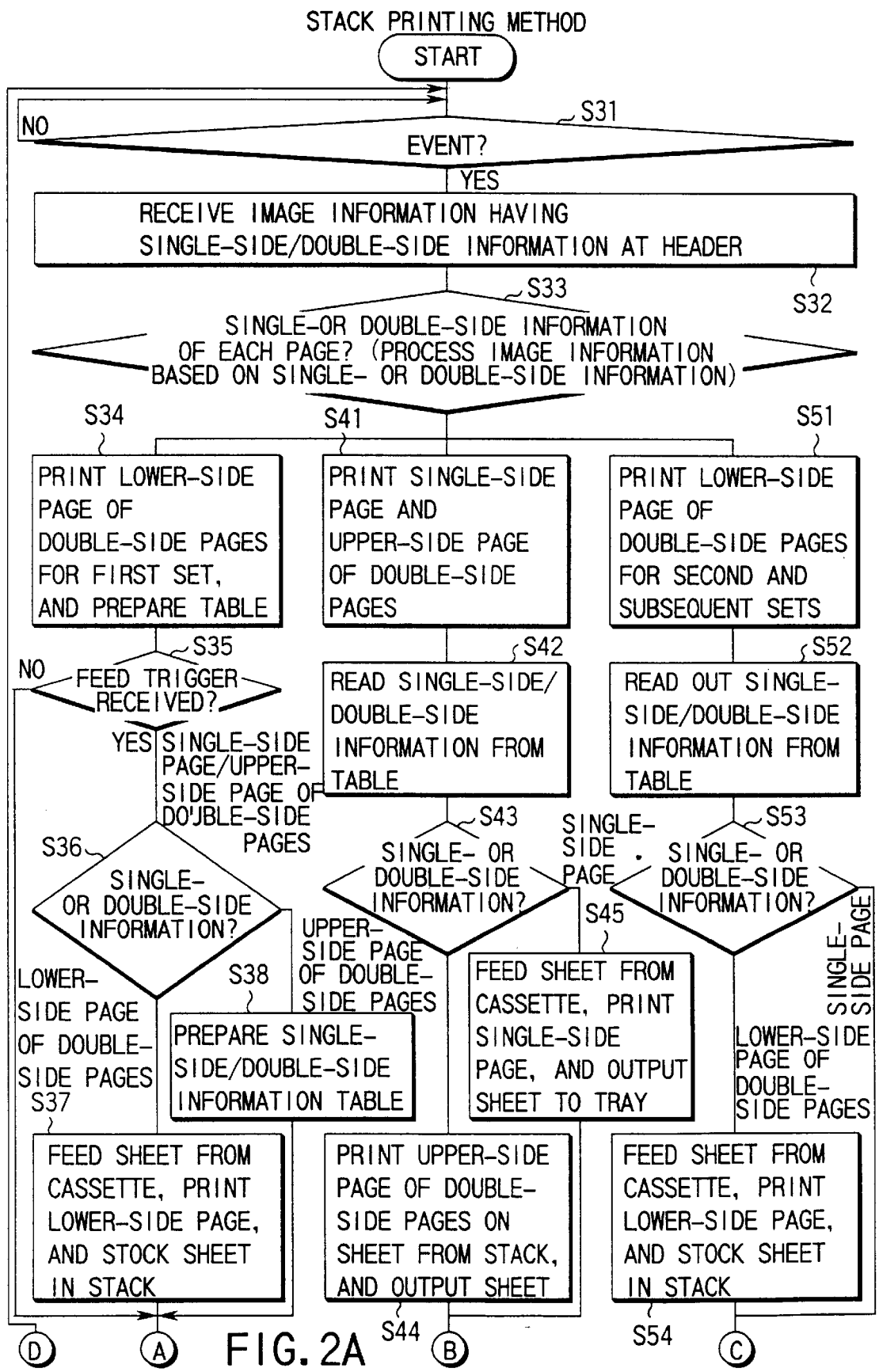
FIGS. 2A and 2B are flow charts showing a stackless image forming method according to the second embodiment of the present invention.
Figure 2B:
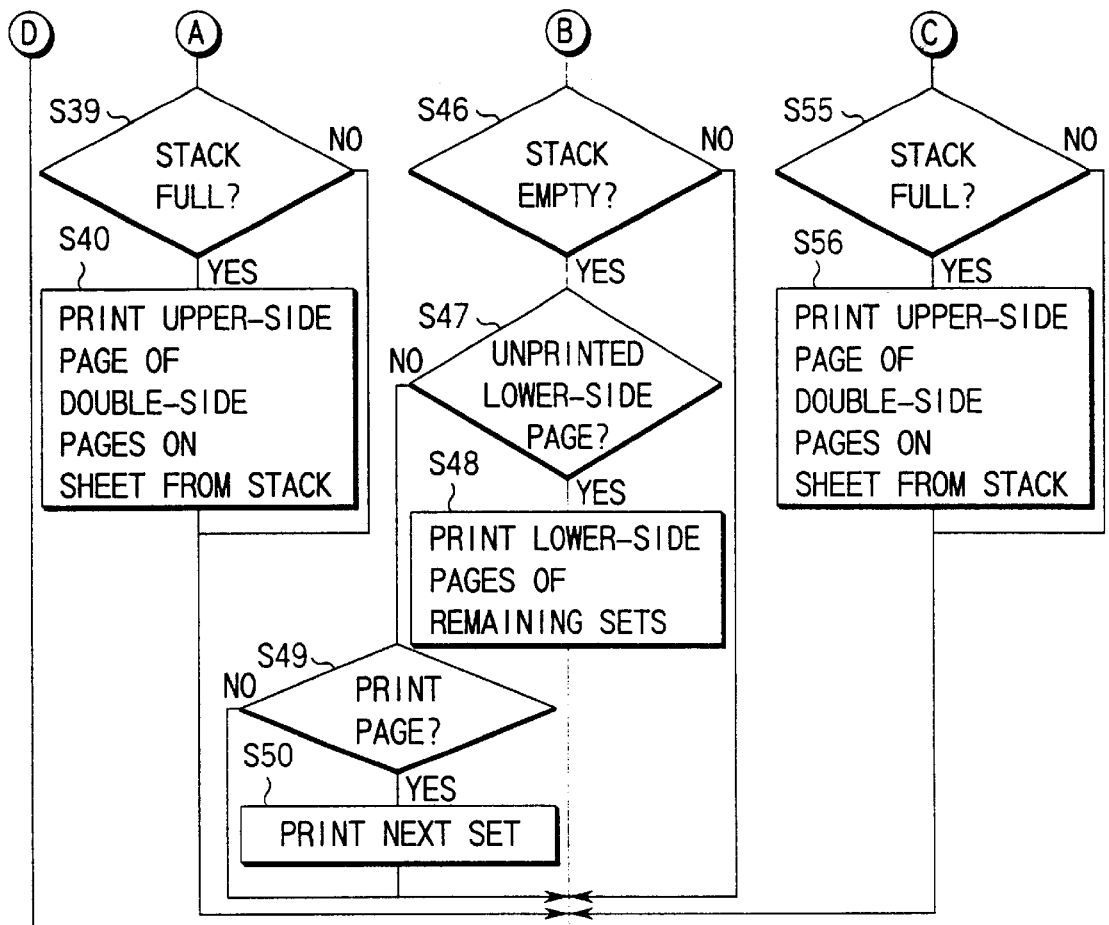
Figure 3:
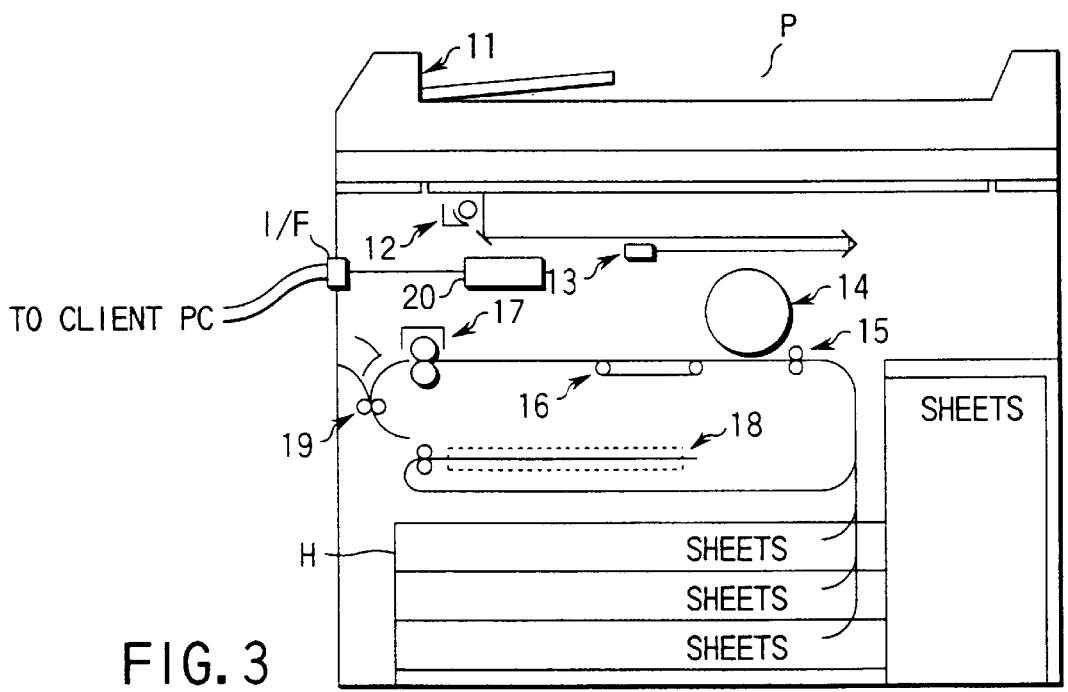
FIG. 3 is a sectional view showing a stack image forming apparatus according to the present invention.

An image forming method capable of printing images in single- and double-side printing modes according to the present invention will be briefly explained using an image forming apparatus as an arrangement for practicing this method. FIG. 1 is a flow chart showing a stackless image forming method according to the present invention. FIGS. 2A and 2B are flow charts showing a stackless image forming method. FIG. 3 is a sectional view showing a stack image forming apparatus according to the present invention.

The present invention relates to an image forming method of receiving image information in single- and double-side printing modes by communication or the like, determining whether the received image information requires single- or double-side printing, in accordance with control information representing single- or double-side printing that is included in header information while receiving the image information, and printing the image information. FIG. 1 shows an image forming method using no stack type apparatus, and FIGS. 2A and 2B show an image forming method using a stack type apparatus. In processing common to the two methods, single-side/double-side printing control information included in header information is read, the type of printing is determined for each page (S15, S20, and S33), and the page is printed in accordance with the determination result. This processing allows sequentially forming the images of a document in single- and double-side printing modes. Various image formation processes for image information of each page will be explained in detail below with reference to the several views of the accompanying drawing.

A stack image forming apparatus P shown in FIG. 3 exhibits one arrangement of a stack image forming apparatus suitably used for image formation processing shown in the flow charts of FIGS. 2A and 2B. In FIG. 3, the image forming apparatus P comprises a scanner for reading a document image, a printer for forming the read image on a recording sheet, and an automatic document feeder 11 for feeding a document to be copied, and stocking the copied document. The scanner has a carriage 12 for moving a light source for irradiating a document so as to receive the document image, and a lens 13 which is moved by the carriage 12 and gives a predetermined imaging characteristic to light (image light) corresponding to the image of a document D. The printer has an image forming unit 14 for transferring a toner image onto a transfer medium (sheet) supplied from a sheet convey mechanism in accordance with image information corresponding to the image of the document D formed on the lens 13, and outputting the toner image. As a convey unit, aligning rollers 15 for temporarily stopping a sheet conveyed toward a photosensitive drum to correct any skew of the sheet with respect to the sheet convey direction, and matching the timing of the leading end of a toner image formed on the photo-sensitive drum with the timing of the leading end of the sheet to feed the sheet are disposed between the photosensitive drum of the image forming unit 14, and a reverse mechanism 16. A fixing unit 17 for fixing to a sheet a visual image transferred to the sheet is arranged on the downstream side of the aligning rollers 15. The image forming apparatus further comprises a stack 18 for temporarily stacking a sheet having a toner image fixed by the fixing unit 17, a selector 19 for selectively supplying a sheet having a toner image to either of the outside of the copying mechanism and the reverse mechanism 16, and a sheet cassette H for stocking and feeding sheets used for image formation.

The operations of these mechanisms are controlled by a control system mainly using the central processing unit (CPU) of a control electrical unit 20 located at the center. A document image conveyed by the automatic document feeder 11 is formed on a recording sheet, and output.

The image forming apparatus comprises an interface terminal I/F for transmitting/receiving an operation control signal and image signal from an external terminal or the like. The interface terminal I/F supplies an operation control signal, image signal, and the like to the control electrical unit 20. Accordingly, for example, document image signals and control signals can be supplied to the image forming apparatus P from a terminal device connected to a network, thereby outputting a predetermined number of recording sheets having images corresponding to the document image signals transmitted by an operation from the terminal device.

Figure 4:
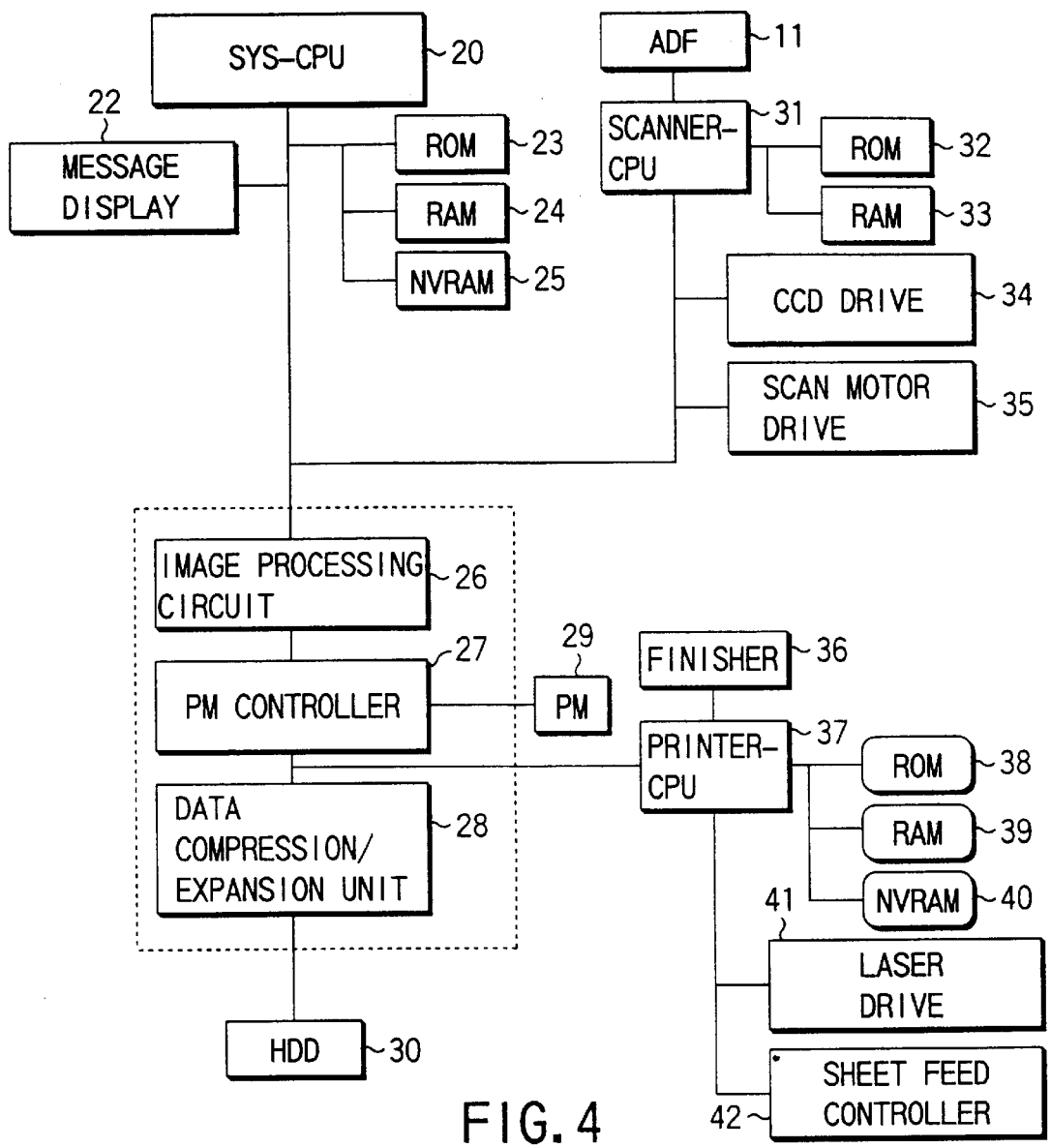
FIG. 4 is a block diagram showing an example of a control system for practicing the image forming method according to the present invention.
Figure 5:
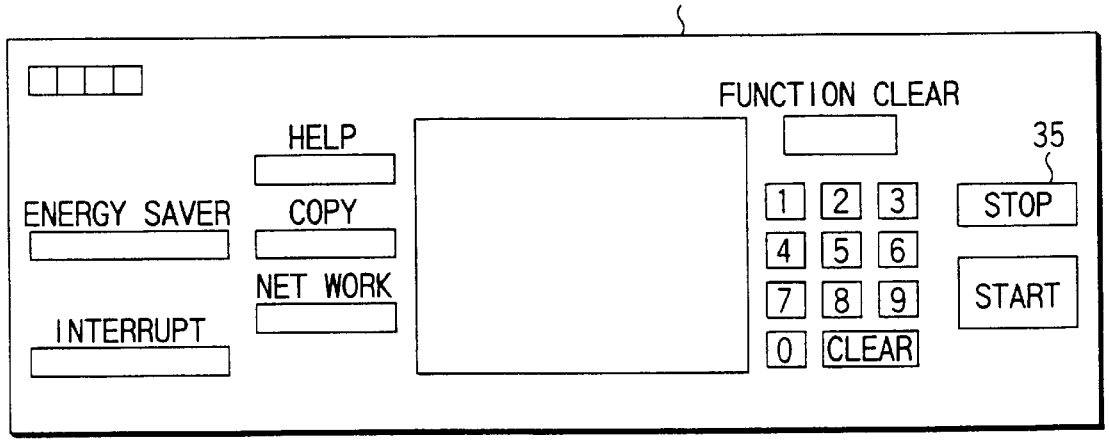
FIG. 5 is a view showing an example of the message display of the control system according to the present invention.
Figure 6:
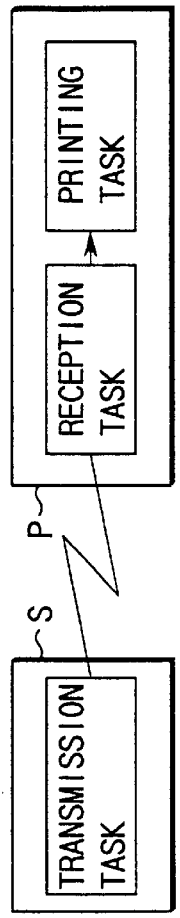
FIG. 6 is a view showing an example of an image forming system according to the present invention.
Figure 7:
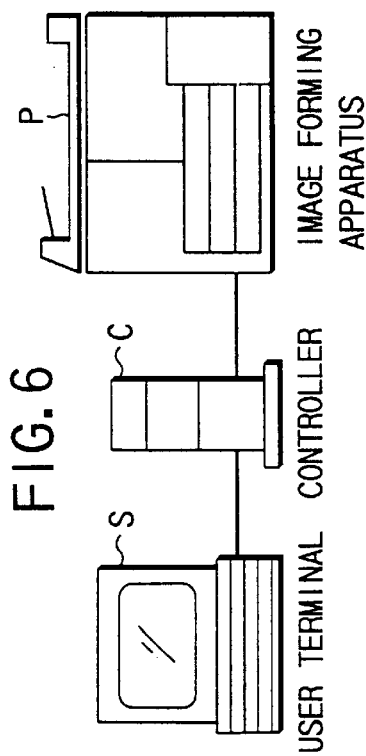
FIG. 7 is a view showing a task structure for practicing the image forming method according to the present invention.

FIG. 4 is a block diagram showing an example of a control system for implementing the image forming method according to the present invention. FIG. 5 is a view showing an example of a message display. FIG. 6 is a view showing an example of an image forming system according to the present invention. FIG. 7 is a view showing a task structure for practicing the image forming method.

The image forming apparatus P has a control system as shown in FIG. 4, in the control electrical unit 20. In FIG. 4, a SYSTEM-CPU 21 for integrating and controlling the whole operation is connected to a user-operable message display 22 as shown in FIG. 5. The SYSTEM-CPU 21 is further connected via a data bus to a ROM 23 storing permanent programs and the like, a RAM 24 for storing rewritable control data and the like, and an NVRAM 25.

An image processor comprises a page memory 29 for storing image information to be processed, a page memory controller 27 for controlling the operation of this memory, and an image processing circuit 25 for executing predetermined processing for image information stored in the page memory. The image processor is connected to the SYSTEM-CPU 21 via a data bus. The image processor further comprises a data compression/expansion unit 28 for performing data compression/expansion processing for image information and the like. A hard disk drive 30 for storing compressed/expanded image information and the like is connected via a data bus.

The automatic document feeder 11 is connected to a SCANNER-CPU 31 for controlling the operation of the feeder 11. The SCANNER-CPU 31 is connected via a data bus to a read-only ROM 32 storing permanent programs and the like, a RAM 33 for storing rewritable control data and the like, an NVRAM 34, and a scan motor drive 35.

A PRINTER-CPU, 37 for controlling the operation of a finisher 36 outside the image forming apparatus is connected to the above image processor. The PRINTER-CPU 37 is connected via a data bus to a read-only ROM 38 storing permanent programs and the like, a RAM 39 for storing rewritable control data and the like, and an NVRAM 40. All these components function as a control system. The PRINTER-CPU 37 controls the whole image formation operation by controlling a laser drive 41 for controlling the operation of a laser exposure device, and a sheet feed controller 42 for controlling the operation of a sheet feed device.

In accordance with an operation through a control panel shown in FIG. 5, the SYSTEM-CPU 21 executes flickering of an LED, display of a character string on an LCD, and operation control corresponding to an operation, and sends instructions to the SCANNER-CPU 31 and PRINTER-CPU 37. The SYSTEM-CPU 21 receives states from the SCANNER-CPU 31 and PRINTER-CPU 37 by serial communication, and displays the states. At this time, the SCANNER-CPU 31 and PRINTER-CPU 37 control respective drive devices in accordance with instructions from the SYSTEM-CPU.

FIG. 6 shows an example of an image forming system for practicing the image forming method of the present invention. In FIG. 6, a user terminal S such as a personal computer and the image forming apparatus P such as a digital copying machine are connected via a communication line, and a controller C is inserted between them. The controller C can add a special value like one to be described in detail in the third embodiment by performing predetermined processing for signals to be processed by the user terminal S and image forming apparatus P.

FIG. 7 shows a task structure for practicing the image forming method according to the present invention. A transmission task is transmitted from the user terminal S. The reception task received by the image forming apparatus P is converted into a printing task to process the printing task.

Stackless printing in single- and double-side printing modes in this task structure according to the first embodiment of the present invention will be explained with reference to the flow chart of FIG. 1 and the explanatory view of FIG. 8.

<First Embodiment: Stackless Printing in Single- and Double-Side Printing Modes>

The first embodiment relates to an image forming method for realizing printing in a double-side printing mode using an automatic double-faces unit ADU for temporarily avoidably holding one or two sheets at most without using any stack (18: FIG. 3) capable of smoothly printing a plurality of double-side pages. The gist of the present invention is to add single-side/double-side printing control information of each page to image information (e.g., header) and sequentially form images in accordance with the determination result of the control information while receiving image signals. Therefore, the present invention is not limited to the stackless type method of the first embodiment.

Figure 8:
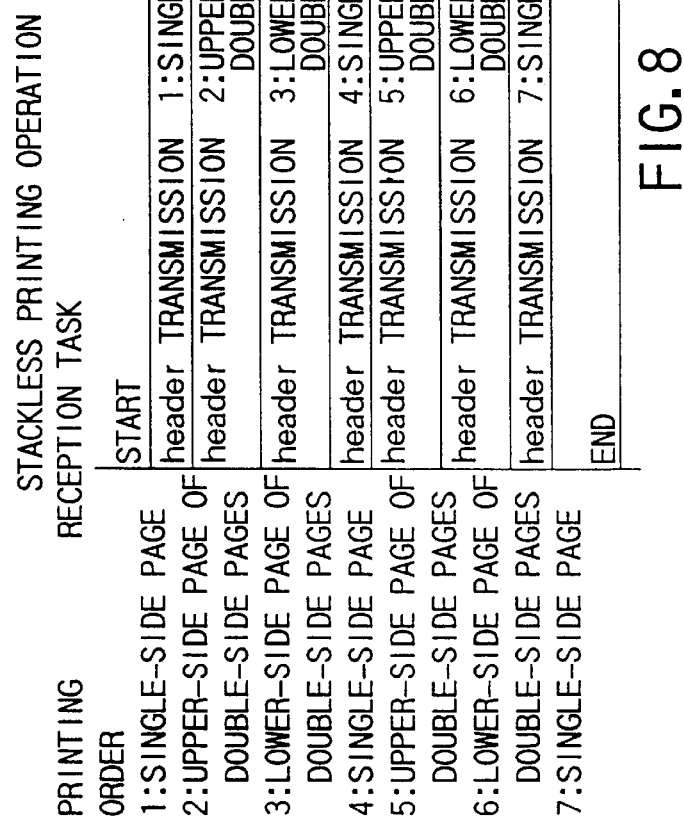
FIG. 8 is a view for explaining stackless printing operation according to the present invention.

Printing upon reception of image information including single-side/double-side printing information for seven pages as shown in FIG. 8 will be explained with reference to the flow chart of FIG. 1. Assume that stackless printing operation is executed by an image forming apparatus having the automatic double-faces unit ADU having no stack 18 of the image forming apparatus shown in FIG. 3.

Upon occurrence of an event representing the presence of a printing instruction from a user terminal connected through a communication cable or the like (S11), a SYSTEM-CPU 21 of an interface control electrical unit 20 processes image information which is received via a unit I/F and includes single-side/double-side printing information at the header (S12). In this case, the SYSTEM-CPU 21 determines the type of printing for each page of the image information by determining single-side/double-side printing information with reference to information in memories 23 and 24. A printing table for image formation processing corresponding to the type of printing is saved as a file in, e.g., a hard disk drive 30. If printing is for the first set (S13), whether a feed trigger is received is checked (S14). Then, whether each page has single- or double-side information is checked, and the received image information is printed based on the determined information.

A document image shown in FIG. 8 is image information of a total of seven pages in which the first document sheet has a single-side page, the second document sheet has double-side pages, the third document sheet has a single-side page, the fourth document sheet has double-side pages, and the fifth document sheet has a single-side page.

In printing the single-side page of the first document sheet, as soon as image information of single-side page 1 is received, a sheet is fed from a sheet cassette H, the image information is printed, and the sheet having the toner image is output to a tray (S18).

In printing the double-side pages of the second document sheet, processing for upper-side page 2 of the double-surface pages is skipped (S16).

In printing the double-side pages of the second document sheet, lower-side page 3 of the double-side pages is processed such that a sheet is fed from the sheet cassette H, image information is printed, and the sheet having the toner image is output to the automatic double-faces unit ADU (S17). This sheet is picked up from ADU, image information on the skipped upper-side page 2 of the double-side pages is printed on the opposite surface of the sheet, and the sheet is output to the tray (S16).

In printing the single-side page of the third document sheet, as soon as image information of single-side page 4 is received, the image information is printed, and the sheet is output to the tray, similar to single-side printing of the first document sheet (S18).

In printing the double-side pages of the fourth document sheet, upper-side page 5 and lower-side page 6 of the double-side pages are printed similarly to double-side printing of the second document sheet. That is, processing for the upper-side page is skipped. After the lower-side page is printed, the sheet is picked up from ADU, the upper-side page is printed on the opposite surface of the sheet, and the sheet is output to the tray (S16 and S17).

The single-side page of the fifth document sheet is printed similarly to single-side printing of the first document sheet.

In this manner, in printing a single-side page, an image is formed and output every time image information is received. In printing double-side pages, processing for the upper-side page is skipped. After the lower-side page is printed, the sheet is picked up from ADU, the lower-side page is printed, and the sheet is output. This sequence is repeated to realize printing in single- and double-side printing modes.

When received image information must be printed for a plurality of sets such as five or 10 sets, a table for managing, the relationship between single-side/double-side information and image information is prepared while image information is received. Image information is read out in an order represented by the table, and an image is formed and output. Smooth image formation processing can be achieved.

However, the reception order and printing order are different from each other. In double-side printing, the image information reception order is "upper-side page→lower-side page", and the image forming order is "lower-side page→upper-side page". Hence, a table need not always be set. Every time received single-side/double-side information is read out, and images are formed for the second and subsequent sets, processing may be skipped to realize this image formation order.

The first embodiment has been described by exemplifying the image forming apparatus as a digital copying machine. Even if the image forming apparatus is a digital printer having no scanner, the same effects of the present invention can be attained so long as the apparatus performs similar single-side/double-side information processing.

<Second Embodiment: Stack Printing in Single- and Double-Side Printing Modes>

The second embodiment realizes printing in single- and double-side printing modes using a stack (18: FIG. 3) capable of smoothly printing a plurality of double-side pages.

The processing sequence of printing in single- and double-side printing modes in the explanatory views of FIGS. 9 and 10 will be explained with reference to the flow charts of FIGS. 2A and 2B. Processing when the stack becomes full will be explained with reference to the explanatory view of FIG. 11.

Figure 9:
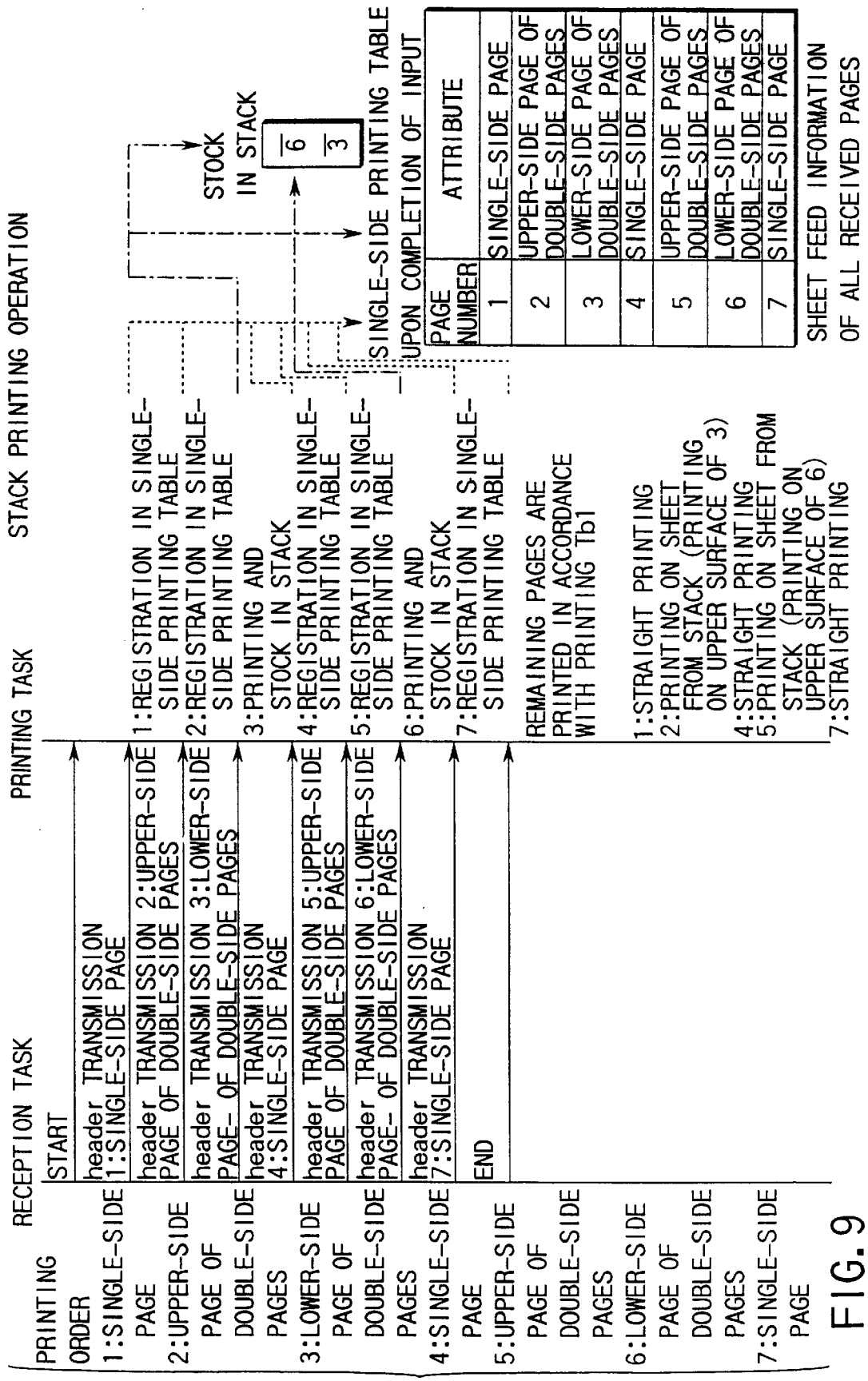
FIG. 9 is a view for explaining the first stackless printing operation according to the present invention.

A document image shown in FIG. 9 is image information of a total of seven pages in which the first document sheet has a single-side page, the second document sheet has double-side pages, the third document sheet has a single-side page, the fourth document sheet has double-side pages, and the fifth document sheet has a single-side page. Assume that stack printing operation is executed by an image forming apparatus having an automatic double-faces unit ADU with the stack 18 of the image forming apparatus shown in FIG. 3.

Upon occurrence of an event representing the presence of a printing instruction from a user terminal connected through a communication cable or the like (S31), a SYSTEM-CPU 21 of a control electrical unit 20 processes image information which is received via an interface unit I/F and includes single-side/double-side printing information at the header (S32). In this case, the SYSTEM-CPU 21 determines the type of printing for each page of the image information by determining single-side/double-side printing information with reference to information in memories 23 and 24.

At this time, unlike the above-described stackless printing operation, stack printing operation adopts a sequence of stocking a sheet having the lower-side page of double-side pages in the stack, and printing the upper-side page of the double-side pages and a single-side page. For this purpose, a single-side printing table for managing the page number and feed source is prepared-while page header information is received. This table is used in printing upon completion of stacking. The page number and the feed source of the page in a file stored in a hard disk are paired and stored in the table. Referring to this table, an upper-side page is printed.

Whether each page has single- or double-side information is checked, and the received image information is printed based on the determined information (S33). If printing is for the first set (S34), whether a feed trigger is received is checked (S35). Then, whether the page has single- or double-side information is checked (S36). If the page is a single-side printing page or the upper-side page of double-side printing pages, a single-side/double-side printing table is prepared in, e.g., a hard disk drive 30 (S38). If the page is the lower-side page of double-side printing pages, a sheet is fed from a sheet cassette H, image information corresponding to the lower-side page is formed on the sheet, and the sheet is output to the stack 18 (S37).

If image information to be received has been received, and image information corresponding to the lower-side pages of the first set has been formed, single-side pages and the upper-side pages of double-side pages for the first set are printed (S41). Single-side/double-side control information is read out from the prepared table (S42). Image information is printed in an order in which pieces of information are stored in the table (S43). If single-side/double-side control information represents a single-side page (S43), a sheet is fed from the cassette, the single-side page is printed, and the sheet is output to the tray (S45). If single-side/double-side control information represents the upper-side page of double-side pages (S43), the sheet having the image of the lower-side page is picked up from the stack 18, the image of the upper-side page is printed on the opposite surface of the sheet, and the sheet is output to the tray (S44). This processing is performed for all the table information. If the stack becomes empty (S46), and lower-side pages are still left unprinted (S47), these pages are printed (S48). If all the lower-side pages have been printed (S49), the current set has been printed, and the next set is printed (S50).

The lower-side pages of double-side pages for the second and subsequent sets are printed (S51). For the second and subsequent sets, table information has already been completed, and is read out (S52). The lower-side pages of double-side pages are printed, and all the printed sheets are stocked in the stack 18 (S54).

Then, single-side pages and the upper-side pages of double-side pages for the second and subsequent sets are printed. This processing is the same as step S41 and subsequent steps (S41 to S44).

A case in which the stack becomes full while the lower-side pages of double-side pages are printed will be described with reference to the flow chart of FIG. 2B. In this flow chart, if the stack 18 is confirmed to become full while the lower-side pages of double-side pages for the first set are printed (S39), sheets are picked up from the stack 18 so as to empty the stack 18, and the upper-side pages of the double-side pages are printed on these sheets (S40). If the stack 18 is confirmed to become full while the lower-side pages of double-side pages for the second set are printed (S55), sheets are similarly picked up from the stack 18 so as to empty the stack 18, and the upper-side pages of the double-side pages are printed on these sheets (S56). Proper processing corresponding to the limit of the stack 18 can be executed.

Printing according to the sequences shown in the above flow charts will be explained with reference to FIG. 9. A document image shown in FIG. 9 is image information of a total of seven pages in which the first document sheet has a single-side page, the second document sheet has double-side pages, the third document sheet has a single-side page, the fourth document sheet has double-side information, and the fifth document sheet has single-side pages.

In printing the single-side page of the first document sheet, as soon as image information of single-side page 1 is received, it is registered in table information (S38).

In printing the double-side pages of the second document sheet, image information of upper-side page 2 of the double-side pages is similarly registered in table information (S38).

In printing the double-side pages of the second document sheet, lower-side page 3 of the double-side pages is processed such that a sheet is fed from the sheet cassette H, image information is printed, and the sheet having the toner image is output to the stack 18 of the automatic double-faces unit ADU (S37).

In printing the single-side page of the third document sheet, as soon as image information of single-side page 4 is received, it is registered in table information, similar to single-side printing of the first document sheet (S38).

In printing the double-side pages of the fourth document sheet, upper-side page 5 and lower-side page 6 of the double-side pages are printed similarly to double-side printing of the second document sheet. That is, a sheet is picked up from the sheet cassette H, image information is printed, and the sheet having the toner image is output to the stack 18 of the automatic double-faces unit ADU (S37).

Single-side printing of the fifth document sheet is also performed similarly to single-side printing of the first document sheet.

As described above, in printing a single-side page and the upper-side; page of double-side pages, image information is registered in table information every time the image information is received. In printing the lower-side page of double-side pages, a sheet is picked up from the sheet cassette H, image information is printed, and the sheet having the toner image is output to the stack 18 of the automatic double-faces unit ADU. This sequence is repeated. After this processing is done for all pieces of lower-side/upper-side control information (S37, S38), single-side pages and the upper-side pages of double-side pages are printed for the table information using recording sheets stocked in the stack (S41 to S44). The printed sheets are output to the tray, thereby completing image formation.

A detailed example of stack printing operation in FIG. 10 will be described.

Stack printing operation for 12-page image information of an 8-sheet document will be explained.

The first and second pages have single-side information, which are registered in table information.

The third page is the upper-side page of double-side pages, and its image information is also registered in the table information.

The fourth page is the lower-side page of the double-side pages. A sheet is picked up from the sheet cassette H, image information is printed, and the sheet having the toner image is output to the stack 18 of the automatic double-faces unit ADU.

Image information on upper-side pages 5, 7, and 9 of double-side pages, and image information on single-side pages 11 and 12 are registered in the table information every time.

Pieces of image information on lower-side pages 6, 8, and 10 of the double-side pages are printed on sheets picked up from the sheet cassette H. The sheets having the toner images are output to the automatic double-faces unit ADU.

When four sheets having image information on the lower-side pages of double-side pages are stocked in the stack 18, their table information is used to print image information on single-side pages and the upper-side pages of double-side pages on sheets in the sheet cassette H and the sheets in the stack 18 in the signal reception order.

Figure 11A:
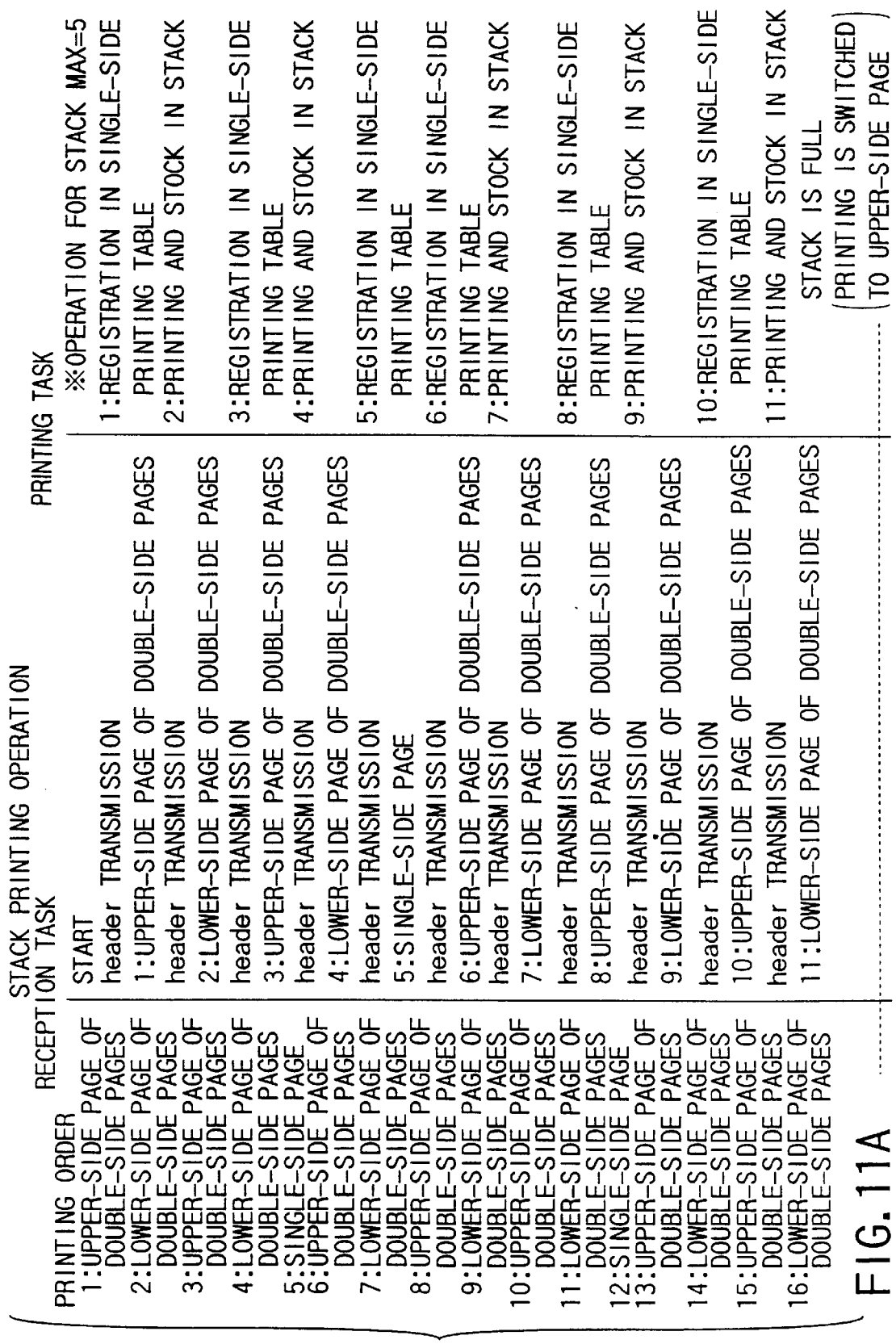

A detailed example of stack printing operation in FIGS. 11A and 11B when the stack becomes full during printing operation will be described.

Stack printing operation for 16-page image information of a nine-sheet document will be explained.

Processing for double-side images and single-side images from pages 1 to 11 is the same as that described above. After a sheet having image information of page 11 is stocked in the stack, the stack becomes full (S39). For this reason, even before image information on the lower-side pages of double-side pages of all received information for the first set is to be formed, image information on the upper-side pages is printed on sheets stocked in the stack (S40). While image information on an upper-side page such as page 14 or 16 is printed, even printing for the lower-side page of double-side pages is postponed, and the image information is registered in the table. After upper-side pages are printed to empty the stack, if any lower-side pages of the current set are left unprinted (S46), their image information is printed (S48). At last, image information on two upper-side pages (pages 13 and 15) is printed to complete the whole processing.

In this fashion, when the number of sheets exceeds the stock capacity of the stack, upper-side pages are printed every time the stack becomes full, thereby emptying the stack. This operation is automatically performed to cancel the full state of the stack.

<Third Embodiment: Application of Printing in Single- and Double-Side Printing Modes to Sheet Insertion>

In the third embodiment, sheet insertion processing is done using the image forming method of printing images in single- and double-side printing modes. Sheet insertion means a function of inserting, as the partition or cover of printing results to a specific portion, a characteristic sheet such as a thick sheet or colored sheet specially prepared in a specific cassette or the like, in addition to normal printing sheets. This sheet is special, and its usage is specified. As far as the sheet can be processed as a single-side document, it can be processed at a high speed with high reliability.

Figure 12:
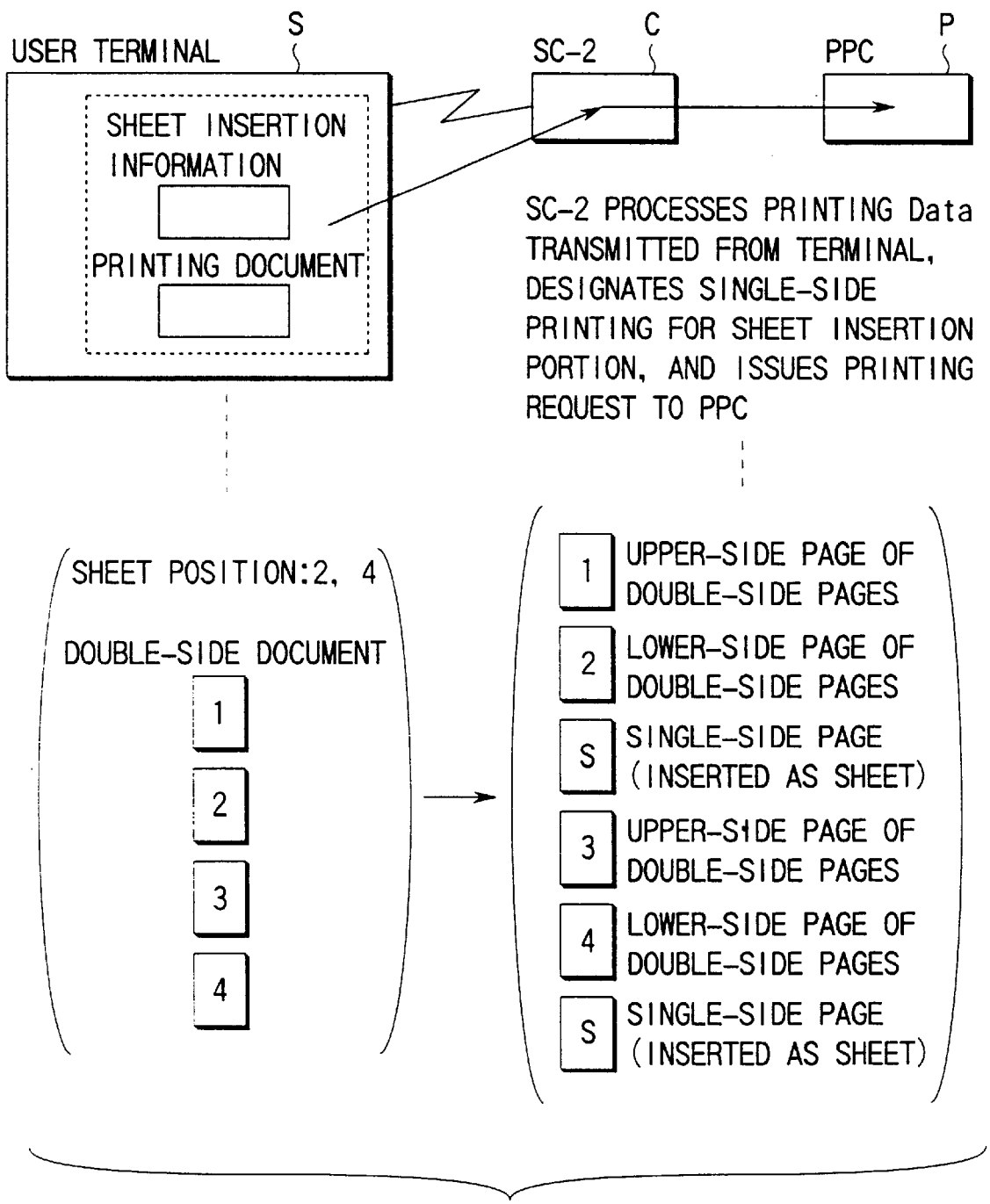
FIG. 12 is a view showing another example of an image forming method according to the third embodiment of the present invention.

In an arrangement as shown in FIG. 12, a controller C as shown in FIG. 6 is interposed between a user terminal S and an image forming apparatus P. A printing request signal from the terminal is temporarily received by the controller C. The controller C adds to the printing request signal a sheet insertion instruction as a control signal requesting a single-side document. As a result, a single-side/double-side printing mode job is generated.

The image forming apparatus P receives (e.g., at the header) image information including double-side document control information to which sheet insertion information representing sheet positions of pages 2 and 4 is added. By the same sequence as in the first and second embodiments, the image forming apparatus P executes this processing as printing in single- and double-side printing modes. For single-side printing, however, a special sheet such as a proper thick colored sheet is inserted at a designated portion as the partition or cover of predetermined printing results, instead of performing single-side printing. Then, images of double-side pages are printed and output.

By single-side printing, an insertion sheet can be inserted at a high processing speed with high reliability by the same method as the above-mentioned printing sequence in single-double-side printing modes. The above insertion sheet processing does not always require the controller C, and can be completely performed by the terminal S.

As has been described above, the present invention can provide an image forming method of receiving image information including, at a header or the like, single-side/double-side control information for each page regardless of a stackless/stack type method, determining whether each page is a single-side printing page, upper-side page of double-side printing pages, or lower-side page of double-side printing pages, and sequentially forming images in accordance with the determination result, and an image forming apparatus for practicing this method. This can solve the problem that a conventional image forming apparatus can perform only single- or double-side printing. Image information in single- and double-side printing modes can be sequentially printed at a high speed with very simple operation.

If insertion sheet control information is added as single-side printing information to double-side printing image information, and processed by the same sequence as that of printing in single- and double-side printing modes, an insertion sheet can be inserted more stably during double-side printing.

What is claimed is:

1. An image forming method comprising the steps of:
    a reception step of receiving image information including control information representing one of single-side printing and double-side printing for each page;
    an image formation step of determining for each page corresponding to the control information received in the reception step whether the image information requires one of single-side printing and double-side printing, and forming the image information of the page on an image forming medium;
    a table preparation step of preparing, based on the control information, table information for specifying an image formation order of the image information while the image information is received in the reception step; and
    a second image formation step of forming the image information on the image forming medium for second and subsequent sets corresponding to the table information prepared in the table preparation step after only one set is formed in the first image formation step.

2. An image forming method according to claim 1, wherein the image formation step includes a step of forming the image information one by one while the image information is received in the reception step and before reception of the image information is completed.

3. An image forming method comprising the steps of:
    a reception step of receiving image information including control information representing one of single-side printing and double-side printing for each page;
    a determination step of determining for each page corresponding to the control information received in the reception step whether the image information requires one of single-side printing and double-side printing;
    a first image formation step of forming the image information of the page on an image forming medium when the control information of the page is determined in the determination step to represent single-side printing;

a second image formation step of skipping processing when the control information of the page is determined in the determination step to represent upper-side printing of double-side printing, and forming the image information of the page on the image forming medium when the control information of the page is determined in the determination step to represent lower-side printing of double-side printing;

a third image formation step of forming the image information, corresponding to the control information representing upper-side printing of double-side printing determined in the second image formation step, on a surface opposite to a surface of the image forming medium having the image information corresponding to lower-side printing formed in the second image formation step;

a table preparation step of preparing, based on the control information, table information for specifying an image formation order of the image information while the image information is received in the reception step; and a fourth image formation step of forming the image information on the image forming medium for second and subsequent sets corresponding to the table information prepared in the table preparation step after one set is formed in the first, second, and third image formation steps.

4. An image forming method according to claim 3, wherein the first, second, and third image formation steps comprise the step of forming the image information while the image information is received in the reception step and before reception of the image information is completed.

5. An image forming method comprising the steps of:

a reception step of receiving image information including control information representing one of single-side printing and double-side printing for each page;

a determination step of determining for each page corresponding to the control information received in the reception step whether the image information requires one of single-side printing and double-side printing;

a first image formation step of forming the image information of the page on an image forming medium when the control information of the page is determined in the determination step to represent single-side printing;

a second image formation step of skipping processing when the control information of the page is determined in the determination step to represent upper-side printing of double-side printing, and forming the image information of the page on the image forming medium when the control information of the page is determined in the determination step to represent lower-side printing of double-side printing;

a third image formation step of forming the image information, corresponding to the control information representing upper-side printing of double-side printing determined in the second image formation step on a surface opposite to a surface of the image forming medium having the image information corresponding to lower-side printing formed in the second image formation step;

a table preparation step of, while the image information is received in the reception step, preparing, based on the control information, table information for specifying an image formation order of the image information such that for image formation of the single-side printing, images are formed in a reception order, and for image formation of the double-side printing, a lower-side image is formed and then an upper-side image is formed on the image forming medium; and a fourth image formation step of forming the image information on the image forming medium for second and subsequent sets corresponding to the table information prepared in the table preparation step after only one set is formed in the first, second, and third image formation steps.

6. An image forming method comprising:

a reception step of receiving image information including control information representing one of single-side printing and double-side printing for each page;

a determination step of determining for each page whether the image information requires one of single-side printing and double-side printing, corresponding to the control information received in the reception step;

a table step of stocking the control information in a table information when the control information of the page is determined in the determination step to represent one of single-side printing and upper-side printing of double-side printing;

a first image formation step of forming the image information of the page on an image forming medium and stocking the image forming medium in a stack when the control information of the page is determined in the determination step to represent lower side printing of double-side printing; and a second image formation step of forming the image information corresponding to single-side printing on the image forming medium corresponding to the table information prepared in the table step, and forming the image information corresponding to upper-side printing of the double-side printing on an opposite surface of the image forming medium stocked in the stack after the whole image information corresponding to lower-side printing of the double-side printing is formed in the first image formation step.

7. An image forming method according to claim 6, wherein the first and second image formation steps include the step of forming the image information one by one while the image information is received in the reception step and before reception of the image information is completed.

8. An image forming method according to claim 6, further comprising:

a third image formation step of forming the image information on the image forming medium for second and subsequent sets corresponding to the table information prepared in the table step after only one set is formed in the first and second image formation steps.

9. An image forming method according to claim 6, further comprising:

a second table step of, while the image information is received in the reception step, preparing, corresponding to the control information, second table information for specifying an image formation order of the image information such that image formation corresponding to lower-side printing of the double-side printing is performed on the image forming medium to stock the image forming medium in the stack, and then image formation corresponding to the single-side printing is performed, and then image formation corresponding to upper-side printing of the double-side printing on an opposite surface of the image forming medium stocked in the stack is performed; and a third image formation step of forming the image information on the image forming medium for second and subsequent sets corresponding to the second table information prepared in the second table step after only one set is formed in the first and second image formation steps.

10. An image forming method according to claim 6, further comprising:

a third image formation step of forming image information corresponding to upper-side printing of the double-side printing on an opposite surface of the image forming medium stocked in the stack and outputting the image forming medium, when the stack becomes full with the image forming media having images formed in the first image formation step.

11. An image forming method comprising the steps of:

a reception step of receiving image information including control information representing one of single-side printing and double-side printing for each page, and insertion information instructing insertion of a predetermined sheet; and a processing step of performing in parallel with reception in the reception step, image formation processing of determining for each page corresponding to the control information and the insertion information received in the reception step whether the image information requires one of single-side printing and double-side printing, and printing the image information on double sides of an image recording medium, and processing of, as single-side printing processing, inserting the predetermined sheet to a predetermined position of the image recording medium in accordance with the insertion information, and outputting the predetermined sheet.

12. An image forming apparatus comprising:

reception means for receiving image information including control information representing one of single-side printing and double-side printing for each page;

determination means for determining for each page corresponding to the control information received by the reception means whether the image information requires one of single-side printing and double-side printing;

table means for storing the control information in a table information when the determination means determines that the control information of the page represents one of single-side printing and upper-side printing of double-side printing;

first image formation means for forming the image information of the page on an image forming medium and storing the image forming medium in a stack when the determination means determines that the control information of the page represents lower-side printing of double-side printing; and second image formation means for forming the image information corresponding to the single-side printing on the image forming medium corresponding to the table information stored in the table means, and forming the image information corresponding to upper-side printing of the double-side printing on an opposite surface of the image forming medium stored in the stack after the whole image information corresponding to lower-side printing of the double-side printing is formed by the first image.

* * * * *